2 Sheets--Sheet 2.
E. E. HENEGAN.
Bee-Hives.
No. 140,702. Patented July 8, 1873.
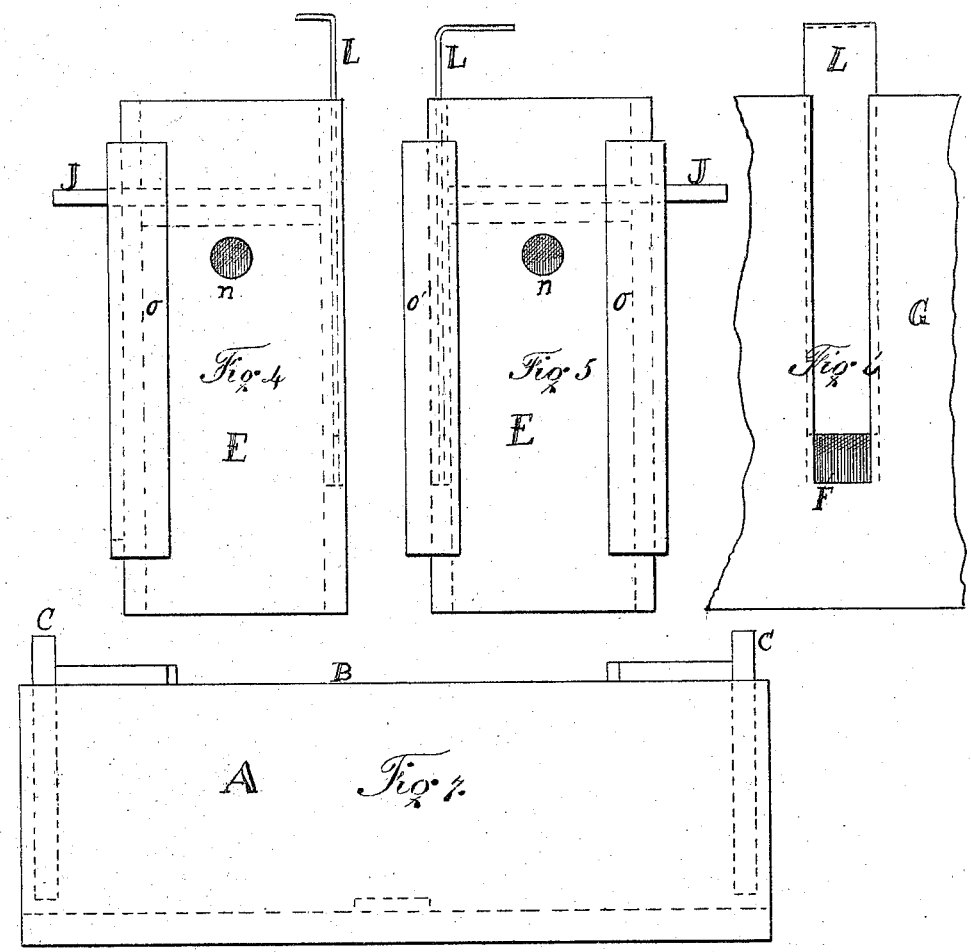
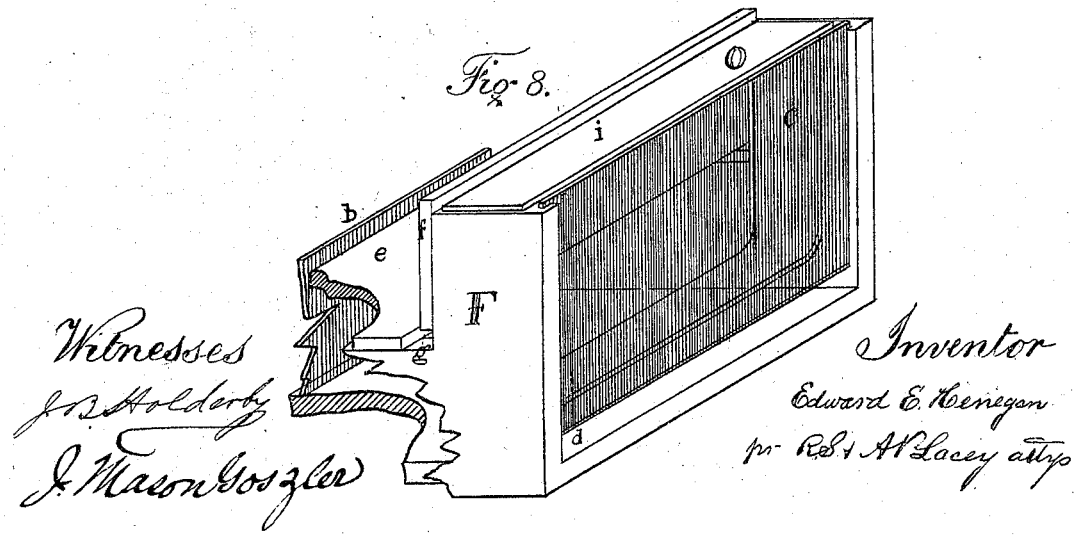
Witnesses
Jn Holderby
J. Mason Goszler
Inventor
Edward E. Henegan
pr R.S. & A.V. Lacey attys

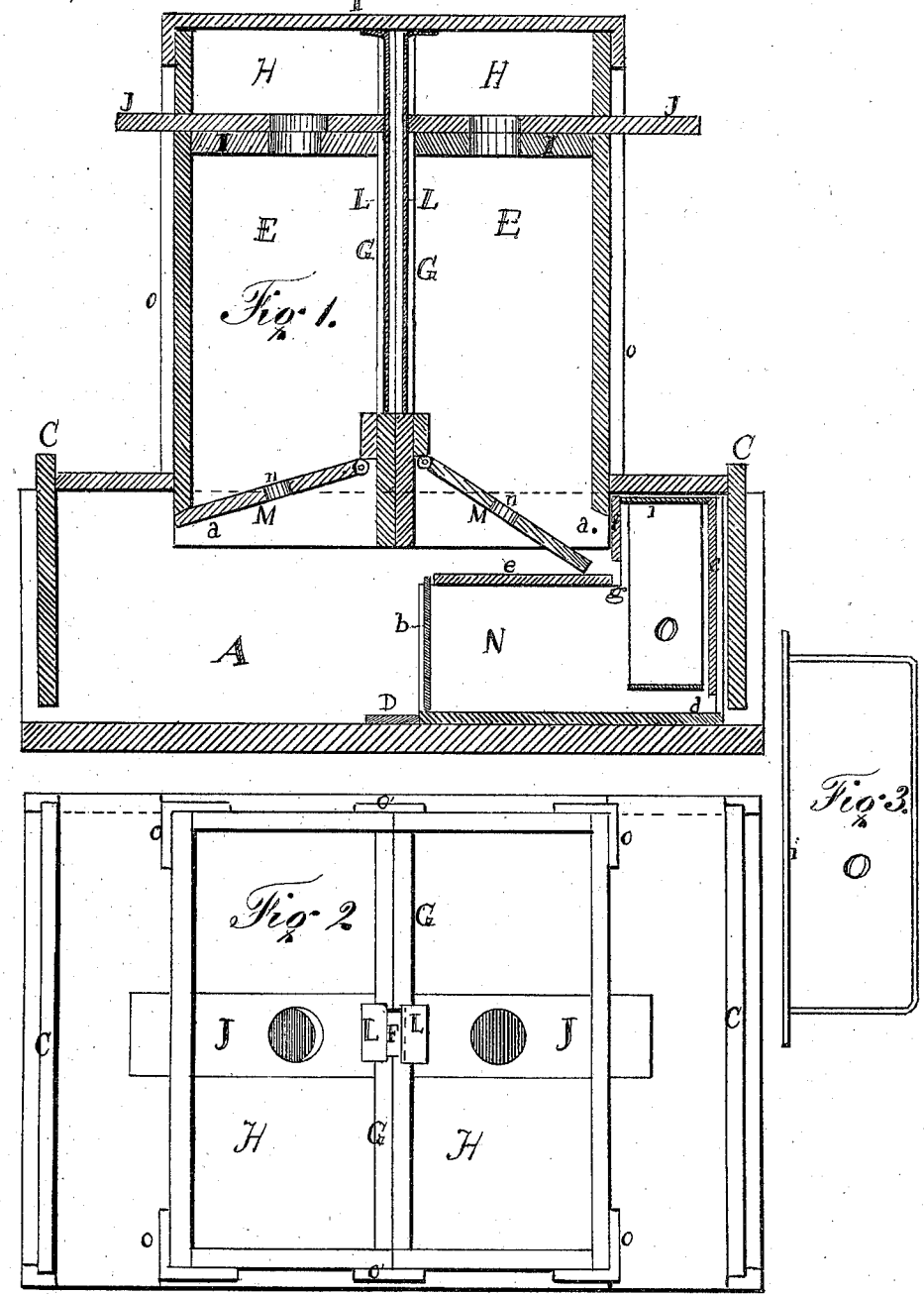

UNITED STATES PATENT OFFICE.

EDWARD E. HENEGAN, OF DOWNSVILLE, WISCONSIN.

IMPROVEMENT IN BEE-HIVES.

Specification forming part of Letters Patent No. 140,702, dated July 8, 1873; application filed April 23, 1873.

*To all whom it may concern:*

Be it known that I, EDWARD E. HENEGAN, of Downsville, in the county of Dunn and State of Wisconsin, have invented certain new and useful Improvements in Bee-Hives; and I do hereby declare the following to be a full, clear, and exact description of the invention, such as will enable others skilled in the art to which it pertains to make and use it, reference being had to the accompanying drawings, which form part of this specification.

My invention has for its object to furnish a bee-hive cheap, convenient, and simple in construction, which shall be so arranged as to facilitate the handling and general management of the bees, and afford perfect protection aganst the intrusions of the moth.

In carrying out my invention I have three boxes—one under or base box and two upper or hive boxes—so constructed that they can be combined and form one single compact hive, and which again may be separated with ease and without disturbance to the swarm. The base box is constructed having its ends closed by sliding doors moving in vertical grooves in the side boards; its top is only partially closed, a central opening being left for the reception of the ends of the united hive-boxes. The doors of the base-box are kept slightly raised to permit entrance of the bees. The two upper or hive-boxes are made equal in size, and of such dimensions that when placed together they form a hive, the end of which fits in and fills the opening in the top of the base-box, the top being covered by a movable cap. These boxes contain the main working-compartments of the hive, and are connected by communicating slots in the contiguous sides. Suitable slides are provided for closing the slots, and doors for closing the lower ends of said boxes, so that the swarm may be divided into equal parts and securely closed in, and one or both boxes removed with little disturbance to the swarm and no danger to the attendant. The hive-boxes are battened at the joinings, which battens are so placed as to prevent the descent of the boxes too low in the base box, and also serve to close any openings that may have been by inadvertence left in said joinings, in which the moth could make its deposits. The doors at lower end of hive-boxes, when not closed, serve as steps for the bees to reach the main compartments, and also prevent the bees from getting into the inner portion of the base-box. The bees are not permitted to work within the chamber of the base-box, but within said box are placed two movable honey-boxes, through which the bees pass to the hive-boxes. These under honey-boxes may be used for the deposit of honey when more room is needed than is afforded by the upper hive-boxes. They are provided with glass-windows, and an adjustable moth-frame for holding a piece of honey-comb to catch the deposits of moth-eggs. They are constructed so as to form rests for the doors of the hive-boxes, and also to give room for the moth-frame in front of and above the line of the passage of the bees to the said hive-boxes; but that my invention may be better understood I will describe it by the accompanying drawings—

Figure 1 is a vertical section of my invention with one of the under honey-boxes removed. Fig. 2 is a plan view with cap removed. Fig. 3 is the moth-frame. Figs. 4, 5, and 7 are the three boxes detached. Fig. 6 is a portion of one of the contiguous sides of the hive-boxes, showing the communicating slot, and closing slide partially withdrawn. Fig. 8 is the under honey-box.

A is the base-box; B, portion of top not closed; C C, sliding doors slightly raised, and closed; D a slat across the center of the bottom to stop the under honey-boxes from sliding too far into the chamber of the base-box. E E are the two hive-boxes, each like the other, and provided with the slots F in the contiguous sides G. H are upper chambers for surplus honey-boxes, formed by the partition I, in which is let the slide J, flush with the upper surface thereof, said slide extending to and operated from the outside of the box. The partition and slide are provided with suitable openings for the passage of the bees. L L are two slides moving in grooves in the sides G for closing the slots F when desired. M are falling doors secured by hinges to the sides G, and when open rest on the top rear casings of the under honey-boxes, and prevent the swarm from getting into the chamber of the box A; when closed they are held by the pins *a*. N is the under honey-box made ⌐-shaped, $b\ c$ are glass windows. Between the window $c$ and the bottom of the box is the opening $d$, and between the casings $e$ and $f$ is the opening $g$ for the passage of the bees. The front portion of this box is made the full and the rear portion about two-thirds the depth of the box A. Within the front portion is placed the movable moth-frame O, which extends nearly to the opening $d$, the top $i$ being constructed so as to close the space between the glass $c$ and casing $f$. Within this frame I fasten a piece of honey-comb of size of frame. The hive is constructed so that the moth can enter only by the open doors C. The eggs of the insect will be deposited in the comb in the frame, the larvæ will work their way to the top of the comb, but are prevented from getting into the hive-boxes by the casing $f$ and the top $i$. The frame can be removed from time to time, the comb destroyed and replaced by other comb, and thus the intrusions of the moth into the main hive are effectually prevented. P is the movable cap fitting over the top of the combined hive-boxes, the rim extending to the battens $o'$, which secure the corners and act as rests for the boxes E E on the box A. The hive-boxes are held together by the battens $o'$, though ordinary hooks or clasps may be used instead of said battens. I prefer the battens, as they close any opening that may be made by lack of perfect fitting of the contiguous edges of the hive boxes. $n\ n$ are apertures for ventilation.

When it is desired to divide the swarm the cap P is removed, the slides L inserted, and the doors M closed, the under honey-box being also removed. The swarm being securely closed in, either box may be removed and replaced by an empty box, the other box being placed on a new base joined to an empty box, and thus two swarms made; the bees are very little disturbed, and little or no honey destroyed.

These boxes can be used in uniting weak swarms, the separate hive-boxes containing the different swarms being placed together, the slides removed and the bees harmonized by any ordinary mode. They can also be used on the same base-box to contain two different swarms, being so arranged that all interference between the bees can be effectually prevented.

Having described my invention, what I claim, and desire to secure by Letters Patent, is—

1. The combination, with the boxes E E, slots F, slides L, doors M, and box A, of a honey-box, N, constructed and arranged substantially as and for the purpose set forth.

2. The under honey-box N, constructed as described, and provided with the moth-frame O, substantially as and for the purposes set forth.

In testimony that I claim the foregoing I have hereunto set my hand and seal this 11th day of April, 1873.

EDWARD E. HENEGAN. [L. S.]

Witnesses:
J. B. HOLDERBY,
J. MASON GOSZLER.